3,746,676
DECORATABLE POLYOLEFIN PLASTICS
Frederick B. Joyner and George O. Cash, Jr., Kingsport, Tenn., assignors to Eastman Kodak Company, Rochester, N.Y.
No Drawing. Filed Mar. 23, 1971, Ser. No. 127,370
Int. Cl. C09j 3/26
U.S. Cl. 260—27                                                     8 Claims

ABSTRACT OF THE DISCLOSURE

A polyolefin composition comprising (1) about 35 to 92 percent of a crystalline polymer of an α-olefin having 2 to 8 carbon atoms containing at least 90 percent α-olefin units and at least part of which has been chemically combined with maleic anhydride, (2) 0 to 30 percent of a crystalline ethylene polymer having a density of about 0.91 to about 0.97, (3) about 5 to 20 percent of an ethylene-propylene copolymer rubber containing 20 to 80 percent ethylene units, and (4) about 3 to about 15 percent of rosin. These polyolefin plastics exhibit excellent adhesion to paints, lacquers, and inks without the need for expensive primers or other surface treatments.

---

This invention relates to novel decoratable polyolefin compositions having improved physical properties. More particularly, this invention relates to new and improved polyolefin compositions having excellent adhesion to paints, lacquers and inks without the need for expensive primers or other special surface treatments.

Crystalline polyolefins such as polyethylene and polypropylene are widely used in many molding and extrusion applications. Usually, whenever colored products are desired, the polyolefin plastics are generally melt-blended with an appropriate pigment. Many pigmented materials, however, are unsatisfactory for molding large parts requiring multi-gated molds. In these cases, especially with the metallic colors, streaks form at the weld lines in the molded piece. Splaying also produces many undesirable effects in pigmented plastics. It is desirable therefore to be able to paint or decorate the molded polyolefin parts. Unlike many polymers containing polar groups, polyolefins, which are non-polar, normally show no adhesion to surface coatings and cannot be painted, printed or decorated without expensive surface treatments. Prior to this invention it has generally been necessary to subject the surface of the molded or extruded polyolefin part to an expensive surface treatment such as priming, electronic treating, flaming, acid etching, and the like in order to provide even barely acequate adhesion between the polyolefin and paint, ink or other decorative materail.

U.S. Pat. 3,483,276 describes blends of polypropylene with maleated polypropylene. These maleated polyolefin compositions exhibit improved adhesion to metals, especially aluminum and other types of substrates to which the polyolefin is applied as a hot melt. It is also disclosed that these blends are said to be much more amenable to the application of dyes, inks, and coating materials generally. It has been discovered that the above-described blends have excellent adhesion to many types of thermosetting enamels but only marginal adhesion at best (and, hence commercially unacceptable) to non-thermosetting acrylic lacquers. It was quite surprising, therefore, to discover that this limitation of the composition of U.S. Pat. No. 3,483,276 could be overcome by the addition of natural rosin and that unusually outstanding results would be obtained from polypropylene compositions containing maleated polypropylene, rosin, and ethylene-propylene rubber. More broadly stated, it has now been discovered unexpectedly that crystalline propylene polymers and certain blends of these polymers with polyethylene when combined with a three-component modifier system comprising maleated polypropylene, natural rosin and an ethylene-propylene copolymer rubber have excellent adhesion to virtually all decorative materials or surface coatings including non-thermosetting acrylic lacquers. These compositions are the first and only polyolefin materials known that can be decorated with acrylic lacquers, as well as other types of paints and inks, without priming or other special surface treatments.

The advantageous effects of the maleated polyolefins and rosin in this invention cannot be solely attributed to the presence of carboxyl groups or carboxyl forming groups in the polymer. Thus, it was found that acrylic acid graft copolymers of polypropylene containing up to 8% acrylic acid showed virtually no adhesion to paints, either alone or when blended with polypropylene. It was also observed that such an acrylic acid graft copolymer showed good adhesion to metals when applied as a hot melt to the metal, but showed almost no improvement over polypropylene in adhesion to electroplated metals. In view of the above, it is evident that the advantageous results provided by this invention could not have been predicted from the prior art and were completely unexpected.

It is an object of this invention to provide novel polyolefin compositions that can be painted with both thermosetting enamels and non-thermosetting lacquers without priming or other surface treatment.

It is another object of this invention to provide new polyolefin compositions having excellent adhesion to all types of surface coatings applied in the form of conventional paints, lacquers, inks and by electro deposition methods.

It is still another object of this invention to provide a method for improving the adhesion of polyolefin plastics to paints, inks, electro-plated metals and other decorating materials without deleteriously affecting the physical properties of the polyolefin.

It is still another object of this invention to provide polyolefin compositions which can be joined to themselves, other plastics or to metals by means of conventional adhesives.

Still another object of this invention is to provide polyolefin plastics which by virtue of exceptionally tenacious adhesion to glass surfaces, can be used advantageously with glass fiber reinforcement in injection molding or as a colaminate with glass fiber mat or fabric.

Other objects are apparent elsewhere in this in this specification.

According to one aspect of this invention there is provided a composition comprising components (1), (2), (3) and (4) as follows: (1) about 35 to about 92% based upon the weight of the composition of a crystalline polymer of at least one α-olefin having 2–8 carbon atoms or blend of such polymer containing at least 90 weight percent α-olefin at least part of which is modified with about 0.17 to 10.0 weight percent based on said crystalline polymer or blend of such polymers of maleic groups; (2) 0 to about 30 percent based upon the weight of the composition of a crystalline ethylene polymer having a density of about 0.91 to about 0.97; (3) about 5 to about 20 percent based upon the weight of the composition of an ethylene propylene copolymer rubber containing 20–80 weight percent based on said copolymer rubber of ethylene units, and (4) about 3 to about 15 percent based upon the weight of the composition of rosin.

In an especially preferred embodiment of this invention there is provided a decoratable thermoplastic composition comprising an intimate blend as defined above except that the percentage ranges are (1) about 52 to 85 percent, (2) 0 to about 20 percent, (3) about 10 to 15 percent, and (4) about 5 to 13 percent.

The maleated polyolefins useful in the practice of this invention may be prepared by any of the known procedures as described for example in U.S. Pat. No. 3,414,551, and No. 3,480,580 and U.S. applications Ser. Nos. 519,450, filed Jan. 10, 1966, and Ser. No. 492,849, filed Oct. 4, 1965.

The preferred maleated polyolefin useful in the practice of this invention is maleated polypropylene, but others of value are derived from crystallizable polyolefins selected from the group comprising polyethylene; poly(1-butene); ethylene/propylene copolymers; ethylene/1-butene copolymers; ethylene/1-hexene copolymers; propylene/1-butene copolymers; and poly(4-methyl-1-pentene). Other maleated polyolefins may be used but are less desirable either because of economic reasons or because they do not afford optimum results. It is preferred to use a maleated polyolefin corresponding to the polyolefin to be modified; for example maleated polypropylene is preferred to modify polypropylene.

Component (1) defined above advantageously contains from about 0.2 to about 10 weight percent of constituents equivalent to combined maleic anhydride including substituted maleic anhydride, although the preferred percentage range is about 0.5 to about 5.0 weight percent combined maleic anhydride or a derivative thereof. Although maleic anhydried or acid is preferred, itaconic anhydride, citraconic anhydried and fumaric acid can be used to prepare the modified polyolefins useful in this invention. A convenient measure of combined maleic anhydride content is the saponification number of the maleated polymer. The preferred maleated polyolefins have saponification numbers of about 6 to about 60. The maleated polyolefins may be used alone or may be blended with the corresponding unmodified polyolefins or mixtures of these with other polyolefin materials. It is preferred to utilize the maleated polyolefins blended with the corresponding unmodified polyolefins. The maleated polyolefins may have inherent viscosities as measured in Tetralin at 145° C. of from about 0.1 to 2.5. For practical purposes, however, the maleated polyolefins having low inherent viscosities (e.g. ≤1.0) should be blended with polyolefins of higher inherent viscosities to produce molding grade plastics. If the maleated polyolefins are blended with unmodified, i.e., nonmaleated olefins polymers, the resulting blends preferably should contain a minimum of 0.17 weight percent combined maleic anhydride based on the weight of the blend, this blend being exemplary of component (1) defined above.

The decoratable polyolefin compositions of this invention include components (1) and (2) as described above, of which, preferably, the crystallizable polyolefin portion is polypropylene, or a copolymer of propylene containing at least 90% propylene units or blends of these polymers with up to about 30% polyethylene or ethylene-rich (≥85%) copolymers. The latter may be ethylene/α-olefin, ethylene/vinyl acetate, ethylene/alkyl acrylate or methacrylate, ethylene/acrylic acid and the like. In general, the crystallizable polyolefins which may be advantageously modified according to this invention are derived from one or more olefin monomers having the structure $$CH_2=CH-R$$

wherein R is hydrogen or a primary or secondary hydrocarbon redical of 1 to 6 carbon atoms and have inherent viscosities in the range of about 0.1 to 3.0. The preferred crystallizable polyolefins are polypropylene, propylene/ethylene copolymers, including block copolymers, poly (1-butene), propylene/1-butene copolymers, and poly (4-methyl-1-pentene). As optional component (2) defined above, polyethylene and ethylene-rich copolymers are useful mainly as minor constituents of the overall blends. The polyethylene or ethylene-rich copolymer can have a density of 0.91 or greater and preferably has a density of 0.95–0.97. The melt index of the polyethylene should be about 0.1 to 20; preferably 0.5 to 10. Blends of two or more of these crystallizable polyolefins may be used.

Component (3) as defined above includes one or more substantially amorphous hydrocarbon elastomers such as ethylene-propylene rubber, ethylene-propylene-diene terpolymer rubber, etc., or mixtures thereof. The tricomponent blends described in U.S. Ser. No. 564,049, filed July 11, 1966, and U.S. Pat. No. 3,256,367 are of particular value in the practice of this invention.

The ethylene-propylene copolymer rubber, component (3) defined above, can be used at concentrations of about 5 to about 20 percent but concentrations of 10% to 15% are preferred. Suitable ethylene-propylene copolymer rubber is described in U.S. Pat. No. 3,256,367. The ethylene-propylene rubber should contain 20 to 80 percent by weight of ethylene; preferably the ethylene content should be 30 to 65 percent by weight. The inherent viscosity of the copolymer rubber is measured in Tetralin at 145° C. should advantageously be in the range of 1.0 to 3.5; preferably 1.5 to 3.0. The second order transition temperature of the copolymer rubber should be below −25° C. and preferably below −40° C. It has also been found that those copolymer rubbers known as ethylene-propylene terpolymer rubbers containing minor amounts (up to 10% by weight) of hydrocarbon diene units or other α-olefin units can also be advantageously utilized in the practice of this invention.

Rosin which is intended to include rosin derivatives, such as esterified rosin or hydrogenated rosin, can be advantageously utilized at concentrations of about 3% to 15%, but the preferred concentrations are 5% to 13%, based on the weight of the composition.

The decoratable polyolefin compositions of this invention may be decorated with many types of paints, lacquers, and inks. The principal film-forming ingredients of these materials may be Versamid amides, cellulose nitrate, ethyl cellulose, cellulose esters, acrylic polymers and copolymers, poly(vinyl acetate), alkyd resins, urea formaldehyde resins, malamine formaldehyde resins, lacquer maleic resins, rosin-modified bisphenol resins, chlorinated rubber resins, and the like.

Almost any protective or decorative coating material may be used in the practice of this invention. The coating materials may be used as clear finishes or may be pigmented with the usual paint pigments. The coatings may be applied by any of the conventional techniques used to apply paints, enamels, lacquers, flexographic inks, etc. Of particular value in the practice of this invention are the acrylic type enamels containing melamine formaldehyde or urea formaldehyde resins, the epoxy containing acrylic type coatings, and enamels containing poly (acrylic acid) or poly(methacrylic acid), lacquers based on poly(methyl methacrylate), and the Versamid-based flexographic inks. (Versamids are discussed by Golding, Polymers and Resins, D. Van Nostrand Company, Inc., New York, N.Y., p. 294). Also of particular value are the alkyd-amino finishes based on non-oxidizing alkyds and urea-formaldehyde or melamine-formaldehyde.

In addition to their decorability, the modified, decoratable polyolefin compositions of this invention may be bonded by means of many types of commercial adhesives. The epoxy adhesives are especially valuable in joining or forming bonds between the polyolefin compositions of this invention and many other types of adherends such as wood, metals, glass, rubbers, plastic materials, paperboard and the like.

In general, the conditions under which the modified polyolefin compositions of U.S. Pat. 3,483,276 are molded affect the adhesion of the decorative finish to the molded part. In general, the best results are obtained by injection molding the compositions using high melt temperatures and slow injection or fill rates. However, molding conditions are not critical to the adhesion between the decorative finish and the molded article formed from the compositions of this invention. In some cases, however, immediately after forming a molded part, a freshly decorated surface may show unsatisfactory adhesion initially, but will show excellent adhesion after aging at ordinary temperatures for two to three days. In some cases, especially when the decoratable polyolefin composition contains less than about 0.5 weight percent combined maleic anhydride or less than 7 percent rosin, the initial adhesion of the molded parts to the decorative finish may be improved by preconditioning the molded part by heating it at a temperature of about 5° C. below the softening point for 15 to 30 minutes. None of these factors, however, should be regarded as limiting the invention. They are presented merely to facilitate the practice of the invention.

Any of the conventional melt blending techniques, such as the use of a Banbury mixer, compounding extruder, mixing rolls, and the like, may be used to blend the maleated polyolefins and rosin with the desired crystallizable polyolefins and elastomeric hydrocarbon polymers, i.e., components (1), (2), (3) and (4) as described above.

One method for the determination of the saponification number of the maleated polyolefins which is employed for the examples below is as follows:

Approximately 4 g. of sample is weighed into a 500 ml. alkali-resistant Erlenmeyer flask, and 100 ml. of distilled xylene is added. The mixture is heated under a reflux condenser for one hour and then cooled to 75° F. or lower. From a buret 30 ml. of standardized 0.10 N potassium hydroxide solution in ethyl alcohol is added. The solution is heated under reflux for 45 min. and then cooled. From a buret standardized 0.10 N acetic acid in xylene is added until the mixture is acid to phenolphthalein. Then, at least 1 ml. of excess acetic acid solution is added. The solution is reheated under reflux for 15 min. and removed from the heat. After the addition of 5 ml. of water, the solution is titrated to a faint pink end point with 0.10 N potassium hydroxide solution in ethyl alcohol.

A blank is run in this manner using the same amounts of reagents and the same heating schedule.

$$\text{Sap. No.} = \left( \frac{[(\text{ml. KOH} \times \text{N}) - (\text{ml. CH}_3\text{COOH} \times \text{N})]^{\text{(for sample)}} - [(\text{ml. KOH} \times \text{N}) - (\text{ml. CH}_3\text{COOH} \times \text{N})]^{\text{(for blank)}}}{\text{g. Sample}} \right) \times 56.1$$

As stated previously, the concentration of the maleated polyolefin to be used in the blend will be determined by the saponification number (or concentration of combined maleic anhydride) of the maleated polyolefin and the desired physical properties of the blend. Any desired combination or proportions of the maleated polyolefins and the unmodified polymers may be used in accordance with this invention provided the resulting composition contains at least 0.17% by weight of combined maleic anhydride based on the weight of the crystallizable polymer or blend of such polymers.

The decoratable polyolefin compositions of this invention may contain antioxidants, fire retardants, weathering inhibitors, pigments, nucleating agents, metal deactivators, fillers such as talc, carbon black and the like, reinforcing agents such as glass fibers, asbestos, and the like, functional polymeric additives, and other conventional polyolefin additives.

This invention may be more fully understood by reference to the following illustrative examples, which are intended to describe certain embodiments of this invention. Parts and percentages are by weight and temperatures are in degrees centigrade unless otherwise specified.

All inherent viscosities (I.V.) are determined by measuring the flow time in a Schulken-Sparks viscometer (J. Polymer Science, 26, 227–230, 1957) of a 0.25% solution of the polymer in Tetralin solvent at 145°C.

The melt flow rates are determined in accordance with ASTM D-1238-62T by means of an extrusion plastometer using condition L (230° C.; 2.16 kg. load).

Density is determined using a density gradient tube.

The adhesion of the coatings to the decoratable composition surface is determined by the conventional "cellophane tape adhesion test" in which a crosshatched pattern is scored at about ⅛-inch intervals in the coating. A strip of adhesive cellophane tape (Minnesota Mining and Manufacturing Company) is then applied with moderate finger pressure across the area, after which the tape is removed by grasping it and pulling it rapidly and evenly from the surface. If no paint or ink is removed from the specimen after this treatment, the adhesion of the coating to the specimen surface is classed as excellent. If paint or other coating is stripped away from the specimen only in the cuts or grooves of the crosshatched area, the adhesion is classed as good. If the coating is stripped away from the crosshatched area, but is not removed when the test is applied to a smooth area of the specimen the adhesion is classed as fair. If the coating strips from the specimen when the test is applied to a smooth area, the adhesion is poor.

EXAMPLE 1

In a Banbury mixer are blended together 65 parts of polypropylene having a melt flow rate of 4.5, 10 parts of maleated polypropylene having an inherent viscosity of 0.2 and a saponification number of 41, 10 parts of rosin (water white grade) and 15 parts of Enjay Vistalon 404 ethylene-propylene copolymer rubber. Specimens of this blend are injection molded on an Ankerwerk machine using a melt temperature of 450° F. Specimens are washed with detergent, dried and sprayed with Du Pont Dulux enamel. The painted specimens are air dried, then baked at 250° F. for 30 min. The specimens are allowed to cool to room temperature and the adhesion of the enamel is tested immediately. The adhesion is excellent as determined by the cellophane tape test.

When Du Pont Lucite acrylic lacquer is used instead of the thermosetting enamel and the coating is cured for 1 hr. instead of 30 min., excellent adhesion to the surface is again observed.

Similar results are obtained when amorphous ethylene-propylene-methylenenorborene terpolymer rubber is used in place of the ethylene-propylene rubber above. When the maleated polypropylene is omitted from the above blends, the plastics show poor adhesion to the coatings.

Example A (for comparison)

Maleated polypropylene (7 parts) having an inherent viscosity of 0.2 and a saponification number of 41 is melt blended in a Banbury mixer with stereoregular polypropylene (93 parts) having a melt flow rate of 4.5. The resulting blend is cooled, granulated, and then injection molded on an Ankerwerk screw-ram molding machine using a melt temperature of 450° F. and a slow fill rate. The molded specimens are washed in detergene (note that it is important that no silicone-type mold release agents be used during molding of specimens), dried, and then spray painted using a thermosetting acrylic/melamine-formaldehyde type enamel (e.g., Rinshed-Mason Co., Comanche Red interior enamel). The freshly painted specimens are air dried, then baked at 250° F. for 30 minutes. After aging at room temperature (23° C.) for 48 hours, the adhesion of the paint to the plastic is excellent as shown by the cellophane tape test of cross-hatched specimens. Excellent adhesion is also found on similar specimens treated in boiling water for 30 minutes.

When Du Pont Lucite acrylic lacquer is used instead of the thermosetting enamel and the coating is cured at 250° F. for 1 hr. the coating does not adhere to the molded specimen.

When the concentration of the maleated polypropylene is reduced to 3.5% the adhesion of the thermosetting enamel to a molded specimen of the blend is very poor; the adhesion of acrylic lacquer is nil. When the maleated polypropylene is omitted altogether, the paint adhesion is nil in all cases.

Example B (for comparison)

The procedures of Example 1 are repeated, but the rosin is omitted. The adhesion of the thermosetting enamel is good, but the adhesion of acrylic lacquer is very poor.

Example C (for comparison)

The procedures of Example 1 are repeated but the ethylene-propylene copolymer rubber is omitted. The adhesion of the thermosetting enamel to the plastic is good but the adhesion of the acrylic lacquer is very poor.

EXAMPLES 2–7

The effects of variations in blend composition on the adhesion of thermosetting enamel are shown in the following table. The materials and procedures described in Example 1 are used. Note that the second and third columns list amounts of component (1), the fourth column lists amounts of component (3), and the third column lists amounts of component (4) of the decoratable polyolefin compositions of this invention. Component (2) is optional and not included in the following table.

TABLE I

| Example No. | Composition, parts by wt. | | | | Adhesion to thermosetting enamel [d] |
|---|---|---|---|---|---|
| | Polypropylene | Maleated polypropylene [a] | Rosin [b] | EPR [c] | |
| 2 | 70 | 7.5 | 7.5 | 15 | Excellent. |
| 3 | 70 | 3.5 | 11.5 | 15 | Do. |
| 4 | 70 | 11.5 | 3.5 | 15 | Do. |
| 5 | 70 | 10 | 10 | 10 | Do. |
| 6 | 75 | 10 | 10 | 5 | Do. |
| 7 | 75 | 5 | 5 | 15 | Do. |

[a] Saponification No. 41.
[b] Water-white grade.
[c] Enjay Vistalon 404 ethylene/propylene copolymer rubber (EPR).
[d] Du Pont Dulux enamel.

Example D (for comparison)

Maleated polypropylene having an inherent viscosity of 1.4 and a saponification number of 6 is injection molded using a melt temperature of 400° F. and a slow fill rate. The molded specimens are washed, dried, and painted. Specimens painted with Du Pont Dulux thermosetting enamel are baked at 250° F. for 30 min., while specimens painted with Du Pont Lucite acrylic lacquer are baked at 250° F. for 1 hr. The adhesion of the thermosetting enamel to the polymer is good but the acrylic lacquer showed poor adhesion. No improvement in the adhesion is evident after the coated specimens have aged at room temperature for 3 days.

EXAMPLE 8

The maleated polypropylene (75 parts) described in Example D is blended in a Banbury mixer with 10 parts rosin and 15 parts Enjay Vistalon 404 ethylene/propylene copolymer rubber. Injection molded specimens are washed, dried, and painted. Specimens painted with Du Pont Dulux thermosetting enamel are baked at 250° F. for 30 min., while specimens painted with Du Pont Lucite acrylic lacquer are baked at 250° F. for 1 hr. The specimens are allowed to stand at room temperature for 3 days, then are tested. The adhesion of both the acrylic lacquer and the thermosetting enamel is excellent.

EXAMPLE 9

The procedures of Example 1 are followed, but 12.5 parts of maleated poly(1-butene) having an inherent viscosity of 0.5 and a saponification number of 32 are used instead of the maleated polypropylene, and 15 parts of Enjay Chemical Co., Vistalon 3509 ethylene-propylene-methylenenorbornene terpolymer rubber are used instead of the Vistalon 404 rubber. The adhesion of both thermosetting enamel and acrylic lacquer to injection molded specimens of this blend is excellent.

EXAMPLE 10

The procedures of Example 1 are followed to prepare, mold, and paint specimens of a blend composed of 55 parts of polypropylene, 15 parts of polyethylene having a density of 0.958 and a melt index of 2, 10 parts maleated polypropylene, 10 parts rosin, and 15 parts Vistalon 404 ethylene/propylene copolymer rubber. The adhesion of Du Pont Dulux enamel and of Du Pont Lucite acrylic lacquer to the injection molded specimens is excellent. Similar results are obtained when the proportions of polypropylene and polyethylene are changed to 45.5 parts and 19.5 parts, respectively.

EXAMPLE 11

Two tensile test specimens from each of the blends from Examples 1, 2 and 5 are bonded together by means of lap joints using an epoxy adhesive (U.S. Plywood Corp., epoxy glue). After 24 hours, the bonds are tested in tension using an Instron Tensile Tester. In each case there is no rupture of the bond before the plastic yields or breaks outside the bonded area. When an attempt is made to bond unmodified polypropylene surfaces no adhesion between the plastic surfaces and the epoxy adhesive is observed.

EXAMPLE 12

A blend of 65 parts of polypropylene (melt flow rate 3.1, density 0.912), 10 parts maleated polypropylene (saponification number 41), 10 parts of rosin, and 15 parts Enjay Vistalon 404 ethylene-propylene copolymer rubber are blended in a compounding extruder and extruded into film of 1.5 mil. thickness. The film is printed with a Versamid-based Flexotuf flexographic ink and allowed to dry for 24 hours. The adhesion to the plastic is excellent. Similar results are obtained when the ink is dried for 5 minutes under an infrared lamp (General Electric, 250 w.) at a distance of 18 inches.

EXAMPLE 13

The procedure of Example 12 is followed, except that the thickness of the extruded film is 10 mils. A laminated composite is formed by stacking alternate layers of film and glass fabric or cloth. Four layers of film and three layers of glass cloth are used. The stacked assembly is pressed at 450° F. between platens at a pressure of 1,000 p.s.i. for 1 min. The pressure is maintained while the platens and composite are cooled to room temperature. The laminated composite containing 28% glass has a tensile break strength of 7400 p.s.i. and a modulus in flex-use of 375,000 p.s.i. A laminated composition of similar structure, using unmodified polypropylene film, has a tensile yield strength of 7,200 p.s.i., tensile break strength of 2600 p.s.i. and a modulus in flexure of 297,000 p.s.i.

EXAMPLE 14

To a compounding extruder is fed a mixture of 30 parts by weight ¼-inch glass fibers and 70 parts by weight of a blend having the composition described in Example 1. The extrudate is cooled in chilled water and chopped into pellets ⅛-inch in diameter and ⅛-inch long. The pellets are then fed to a Van Dorn injection molding machine to form articles having exceptionally high strength. When the specimens are broken, examination of the broken ends of the specimens by means of a scanning electron microscope shows that glass fibers are coated with polymer. The glass fibers revealed in the broken ends of specimens from blends of glass fibers with unmodified polypropylene are not coated with polymer, but slip cleanly from the polymer matrix, leaving a clean, cylindrically shaped hole. The glass reinforcement did not detract from the affinity of the modified polypropylene blend for thermosetting enamel or acrylic lacquer. Similarly, fillers such as talc, titania, alumina, or asbestos do not deleteriously affect the paint to plastic surface adhesion when blended in concentrations up to about 40–50% by weight with the modified polypropylene blends.

Example E (for comparison)

This example shows the inoperability of poly(propylene-g-acrylic acid) having a saponification number of 62 when used in lieu of the maleated polypropylene in the blend descibed in Example 1. The procedures of Example 1 are followed except that 10 parts of a poly(propylene-g-acrylic acid) having a saponification number of 62 are substituted for the maleated polypropylene. When molded, the plastic shows no adhesion for either thermosetting enamel or acrylic lacquer.

EXAMPLE 15

The procedure of Example A is followed to compound and mold a blend of maleated polypropylene (7.5 parts) having an inherent viscosity of 0.3 and a saponification number of 58, stereoregular polypropylene (59 parts) having a melt flow rate of 4.5, linear polyethylene (15 parts) having a density of 0.96 and a melt index of 1.0, amorphous Enjay Vistalon 404 ethylene-propylene rubber (11 parts) and rosin (water white grade, 7.5 parts). The molded specimens are spray painted with a thermosetting acrylic/melamine-formaldehyde type enamel and with an acrylic lacquer. The freshly painted specimens are air dried, then baked at 250° F. for one hour. After cooling to room temperature (23° C.), the adhesion of both the enamel and the lacquer to the plastic is excellent as shown by the cellophane tape test on crosshatched specimens.

EXAMPLES 16–21

The procedure of Example 15 is followed using various combinations of stereoregular polypropylene (melt flow rate 4.5), maleated polypropylene (saponification number of 41), linear polyethylene (melt index 0.7), rosin, and Enjay Vistalon 404 ethylene-propylene rubber. The results are shown in the table below.

ing an inherent viscosity of 1.8 instead of polypropylene. The paint-to-plastic adhesion is excellent.

The table below illustrates the physical properties of the paintable blends of this invention. Thus, the compounded blends of Examples 2, 17, and 19 are injection molded into test specimens on an Ankerwerk molding machine and are tested in accordance with the ASTM procedures indicated in the table.

TABLE III

| Property | Test method | Composition, Example No. — | | |
|---|---|---|---|---|
| | | (2) | (17) | (19) |
| Flow rate, g./10 min | ASTM D1238 | 13 | 14 | 12 |
| Tensile strength: | | | | |
| At yield, p.s.i | ASTM D638 | 2,600 | | 2,700 |
| At break, p.s.i | ASTM D638 | 2,400 | 3,100 | 2,400 |
| Stiffness in flexure, p.s.i | ASTM D747 | 83,000 | 99,000 | 77,000 |
| Notched Izod impact strength at 23° C., ft.-lb./in. of notch | ASTM D256 | 1.2 | 1.1 | 1.9 |
| Hardness: | | | | |
| Rockwell (R) | ASTM D785 | 64 | 55 | 36 |
| Shore Durometer (D) | ASTM D1706 | 60 | 65 | 65 |

When the compositions in question are reinforced with ¼-inch glass fibers (such as Johns-Manville Type CS–308) to give composites containing 20% glass, the tensile strengths of the compositions are increased three-fold and the stiffnesses are increased four-fold. These glass fiber composites also show paint adhesion comparable to the original nonreinforced compositions.

The polyolefin compositions of this invention are thus eminently suitable for manufacturing automotive parts which can be painted directly and which can be bonded to metal with common industrial adhesives such as the epoxy adhesives. The compositions of this invention may also be combined with glass fiber matting or fabric to form laminated sheets which can then be thermoformed into various shapes such as automobile door shells, door liners, fender skirts, hoods, and other automobile body parts. The parts thus formed can then be painted or decorated, without priming or other surface treatments other than cleaning, using the same paints used to decorate

TABLE II

| Example No | 16 | 17 | 18 | 19 | 20 | 21 |
|---|---|---|---|---|---|---|
| Composition, percent: | | | | | | |
| Polypropylene | 69 | 64 | 54 | 60 | 55 | 50 |
| Maleated polypropylene | 7.5 | 7.5 | 7.5 | 7.5 | 7.5 | 7.5 |
| Polyethylene | 5 | 10 | 20 | 10 | 15 | 20 |
| Rosin | 7.5 | 7.5 | 7.5 | 7.5 | 7.5 | 7.5 |
| EP rubber | 11 | 11 | 11 | 15 | 15 | 15 |
| Paint adhesion to: | | | | | | |
| Enamel | Excellent | Excellent | Excellent | Excellent | Excellent | Excellent |
| Lacquer | Fair | Excellent | Excellent | Excellent | Excellent | Excellent |

EXAMPLE 22

The procedure of Example 15 is followed except that a branched polyethylene (density 0.912) is used in place of the linear polyethylene. Molded specimens of the blend show excellent adhesion to acrylic/melamine-formaldehyde and alkyd/urea-formaldehyde enamels and to methyl methacrylate-based acrylic lacquers.

Similar results are obtained when the branched polyethylene is replaced by 98/2 ethylene/1-butene copolymer (density 0.95) or by ethylene/1-hexene copolymer (density 0.95).

EXAMPLE 23

The procedure of Example 8 is followed using a maleated 92/8 propylene/ethylene block copolymer having an inherent viscosity of 1.8 and a saponification number of 8 instead of the maleated polypropylene. The adhesion of both the thermosetting enamel and the arcylic lacquer to the molded specimens is excellent.

EXAMPLE 24

The procedure of Example 1 is followed using a co-stereosymmetric 97/3 propylene/1-butene copolymer havthe metal parts of the automobile. The compositions of this invention may be injection molded, extruded, vacuum formed, blow molded, welded, heat sealed, machined, and processed by other conventional techniques normally used on polyolefin plastics.

It is desirable to incorporate antioxidants and, when needed, weathering inhibitors into the compositions of this invention, since the presence of carboxylic acid groups tends to lower the oxidative stability of polyolefins. Any of the conventional polyolefin stabilizers are generally satisfactory, for example, pentaerythritol tetrakis (3,5-di-tert-butyl - 4-hydroxyhydrocinnamate); 1,3,5-trimethyl-2,4, 6 - tri(3,5 - di-tert-butyl-4-hydroxybenzyl)benzene; octadecyl 3,5 - di-tert-butyl-4-hydroxydrocinnamate; and 2,6-bis(1 - methylheptadecyl)-p-cresol. These stabilizers are especially beneficial when used in combination with dilauryl 3,3'-thiodipropionate and/or distearyl 3,3'-thiodipropionate.

Although the invention has been described in considerable detail with reference to certain preferred embodiments thereof, it will be understood that variations and modifications can be effected without departing from the spirit and scope of the invention.

We claim:
1. A composition comprising components (1), (2), and (3) as follows:
   (1) about 35 to about 92 percent, based upon the weight of the composition, of a crystalline propylene polymer containing at least 90 weight percent propylene at least part of which is modified with about 0.17 to 10 weight percent based on said crystalline propylene polymer of maleic groups;
   (2) about 5 to about 20 percent, based upon the weight of the composition, of an ethylene-propylene copolymer rubber containing 20 to 80 weight percent based on said copolymer rubber of ethylene units; and
   (3) about 3 to about 15 percent, based upon the weight of the composition, of rosin.
2. The composition of claim 1 containing (4) up to about 30% based upon the weight of the composition, of a crystalline ethylene polymer having a density of about 0.91 to about 0.97.
3. The composition of claim 2 wherein the percentages of components (1), (2), (3), and (4) are as follows:
   (1) about 52 to 85 percent;
   (2) about 10 to 15 percent;
   (3) about 5 to 13 percent; and
   (4) up to about 20 percent.
4. The composition of claim 2 wherein the crystalline propylene polymer is polypropylene, and the crystalline ethylene polymer is linear polyethylene.
5. The composition of claim 2 wherein the crystalline propylene polymer is polypropylene, the crystalline ethylene polymer is linear polyethylene, and the ethylene-propylene copolymer rubber is ethylene-propylene-methylenenorbornene terpolymer.
6. The composition of claim 2 wherein the crystalline propylene polymer is propylene/ethylene block copolymer, and the crystalline ethylene polymer is ethylene/1-hexene copolymer.
7. The composition of claim 2 wherein the crystalline propylene polymer is propylene/ethylene block copolymer, the crystalline ethylene polymer is ethylene/1-hexene copolymer, and the ethylene-propylene copolymer rubber is ethylene-propylene-methylenenorbornene terpolymer.
8. The composition of claim 2 wherein the crystalline propylene polymer is propylene/1-butene copolymer.

References Cited
UNITED STATES PATENTS

| | | | |
|---|---|---|---|
| 3,697,465 | 10/1972 | Joyner et al. | 260—27 EV |
| 3,542,714 | 11/1970 | Metters | 260—24 |
| 3,220,966 | 11/1965 | Flanagan | 260—27 |
| 3,483,276 | 12/1969 | Mahlman | 260—848 |
| 3,343,582 | 9/1967 | Hines et al. | 260—889 |
| 3,066,132 | 11/1962 | Edmonds | 260—88.2 |

DONALD E. CZAJA, Primary Examiner

W. E. PARKER, Assistant Examiner

U.S. Cl. X.R.

161—170, 203, 217, 251; 260—37, 826, 844, 889